US012595020B2

(12) United States Patent
Kuwayama et al.

(10) Patent No.: US 12,595,020 B2
(45) Date of Patent: Apr. 7, 2026

(54) DISC BRAKE CALIPER OF HUMAN-POWERED VEHICLE

(71) Applicant: SHIMANO INC., Sakai City (JP)

(72) Inventors: Kazuya Kuwayama, Sakai City (JP);
Takahiro Tabata, Sakai City (JP);
Ryosuke Habara, Sakai City (JP);
Takanori Yoshida, Sakai City (JP);
Yusuke Hosomi, Sakai City (JP)

(73) Assignee: SHIMANO INC., Sakai (JP)

( * ) Notice: Subject to any disclaimer, the term of this patent is extended or adjusted under 35 U.S.C. 154(b) by 485 days.

(21) Appl. No.: 18/160,258

(22) Filed: Jan. 26, 2023

(65) Prior Publication Data

US 2024/0253729 A1     Aug. 1, 2024

(51) Int. Cl.
| | |
|---|---|
| *B62L 1/12* | (2006.01) |
| *B62L 1/00* | (2006.01) |
| *F16D 55/228* | (2006.01) |
| *F16D 65/00* | (2006.01) |
| *F16D 65/12* | (2006.01) |
| *F16D 65/18* | (2006.01) |
| *F16D 55/00* | (2006.01) |

(52) U.S. Cl.
CPC ................. *B62L 1/12* (2013.01); *B62L 1/005* (2013.01); *F16D 55/228* (2013.01); *F16D*

*65/0075* (2013.01); *F16D 65/12* (2013.01); *F16D 65/18* (2013.01); *F16D 2055/002* (2013.01)

(58) Field of Classification Search
CPC .......... B62L 1/12; B62L 1/005; F16D 55/228; F16D 2055/002; F16D 65/0075; F16D 65/12; F16D 65/18
See application file for complete search history.

(56) References Cited

U.S. PATENT DOCUMENTS

| | | | |
|---|---|---|---|
| 5,615,754 A | 4/1997 | Kobayashi et al. | |
| 6,347,689 B1 * | 2/2002 | Ohishi .................... | F16D 65/18 |
| | | | 277/439 |
| 2016/0146345 A1 * | 5/2016 | Koshikawa .............. | F16J 1/005 |
| | | | 92/172 |
| 2018/0094681 A1 * | 4/2018 | Reuss .................... | F16D 65/18 |
| 2018/0265166 A1 | 9/2018 | Kondou et al. | |

FOREIGN PATENT DOCUMENTS

| | | |
|---|---|---|
| DE | 10 2018 203 870 | 9/2018 |
| EP | 3242051 | 11/2017 |

\* cited by examiner

*Primary Examiner* — Timothy Hannon
(74) *Attorney, Agent, or Firm* — MORI & WARD, LLP

(57) ABSTRACT

A disc brake caliper of a human-powered vehicle comprises a caliper body and a first piston. The caliper body includes a first hole. The first piston is movably provided in the first hole. The first piston has a first outer diameter. The first outer diameter is larger than or equal to 19 mm.

12 Claims, 8 Drawing Sheets

DISC BRAKE CALIPER OF
HUMAN-POWERED VEHICLE

BACKGROUND

Technical Field

The present invention relates to a disc brake caliper of a human-powered vehicle.

Background Information

A human-powered vehicle includes a brake caliper. The brake caliper includes a piston and a friction member. The piston moves the friction member toward a brake rotor during braking. One of objects of the present disclosure is to improve braking performance of the brake caliper and/or to improve durability of the brake caliper.

SUMMARY

In accordance with a first aspect of the present invention, a disc brake caliper of a human-powered vehicle comprises a caliper body and a first piston. The caliper body includes a first hole. The first piston is movably provided in the first hole. The first piston has a first outer diameter. The first outer diameter is larger than or equal to 19 mm.

With the disc brake caliper according to the first aspect, since the first outer diameter is larger than or equal to 19 mm, for example, it is possible to increase a braking force and/or to decrease a hydraulic pressure to obtain a braking force compared with a case where the first outer diameter is smaller than 19 mm. Thus, it is possible to improve braking performance of the disc brake caliper and/or to improve durability of the disc brake caliper.

In accordance with a second aspect of the present invention, a disc brake caliper of a human-powered vehicle comprises a caliper body and a piston. The caliper body includes a first interior wall, a second interior wall, a hole, and a pad space in which a brake pad is to be at least partially provided. The pad space is defined between the first interior wall and the second interior wall in an arrangement direction. The first interior wall and the second interior wall are spaced apart in the arrangement direction. The second interior wall has a proximal surface and a distal surface. The proximal surface is at least partially provided farther from the first interior wall than the distal surface in the arrangement direction. The reference wall plane is defined on the distal surface. The piston has a center axis and is movably provided in the hole along the center axis. The hole is partially provided farther from the first interior wall than the reference wall plane in the arrangement direction as viewed along the center axis.

With the disc brake caliper according to the second aspect, since the hole is partially provided farther from the first interior wall than the reference wall plane in the arrangement direction as viewed along the center axis, for example, it is possible to increase an outer diameter of the piston. Thus, it is possible to increase a braking force and/or to decrease a hydraulic pressure to obtain a braking force compared with a case where the hole is entirely provided closer to the first interior wall than the reference wall plane in the arrangement direction as viewed along the center axis. Accordingly, it is possible to improve braking performance of the disc brake caliper and/or to improve durability of the disc brake caliper.

In accordance with a third aspect of the present invention, the disc brake caliper according to the second aspect is configured so that the hole has an inner radius. The inner radius is larger than a distance defined between the reference wall plane and the center axis in the arrangement direction.

With the disc brake caliper according to the third aspect, it is possible to reliably increase an outer diameter of the piston.

In accordance with a fourth aspect of the present invention, the disc brake caliper according to the second or third aspect is configured so that the hole includes a first hole and a second hole. The piston includes a first piston and a second piston. The center axis includes a first center axis and a second center axis. The first piston has the first center axis and is movably provided in the first hole along the first center axis. The second piston has the second center axis and is movably provided in the second hole along the second center axis. The second hole is partially provided farther from the first interior wall than the reference wall plane in the arrangement direction as viewed along the second center axis.

With the disc brake caliper according to the fourth aspect, it is possible to increase at least one of a first outer diameter of the first piston and a second outer diameter of the second piston. Thus, it is possible to increase a braking force and/or to decrease a hydraulic pressure to obtain a braking force compared with the case where the second hole is entirely provided closer to the first interior wall than the reference wall plane in the arrangement direction as viewed along the center axis. Accordingly, it is possible to improve braking performance of the disc brake caliper and/or to improve durability of the disc brake caliper.

In accordance with a fifth aspect of the present invention, the disc brake caliper according to the first aspect further comprises a second piston. The caliper body includes a second hole. The second piston is movably provided in the second hole.

With the disc brake caliper according to the fifth aspect, it is possible to increase a braking force and/or to decrease a hydraulic pressure to obtain a braking force compared with a case where the disc brake caliper is free of the second piston. Thus, it is possible to improve braking performance of the disc brake caliper and/or to improve durability of the disc brake caliper.

In accordance with a sixth aspect of the present invention, a disc brake caliper of a human-powered vehicle comprises a caliper body, a first piston, a second piston, a first distance, and a second distance. The caliper body includes a first interior wall, a second interior wall, a first hole, and a second hole. The second hole is provided on an upstream side of the first hole in a driving rotational direction of a disc brake rotor. The caliper body includes a pad space in which a brake pad is to be at least partially provided. The pad space is defined between the first interior wall and the second interior wall in an arrangement direction. The pad space has a length defined between the first interior wall and the second interior wall in the arrangement direction. The first piston has a first center axis and is movably provided in the first hole along the first center axis. The second piston has a second center axis and is movably provided in the second hole along the second center axis. The first distance is defined between the first center axis and a reference center plane in the arrangement direction. The reference center plane is perpendicular to the arrangement direction and is defined to bisect the length of the pad space in the arrangement direction. The second distance is defined between the second center axis and the reference center plane in the arrangement direction. The first distance is shorter than the second distance.

With the disc brake caliper according to the sixth aspect, since the first distance is shorter than the second distance, for example, it is possible to increase an area in which the first piston can be arranged, increasing an outer diameter of the first piston. Thus, it is possible to increase a braking force and/or to decrease a hydraulic pressure to obtain a braking force compared with the case where the piston is entirely provided closer to the first interior wall than the reference wall plane in the arrangement direction as viewed along the center axis. Accordingly, it is possible to improve braking performance of the disc brake caliper and/or to improve durability of the disc brake caliper.

In accordance with a seventh aspect of the present invention, the disc brake caliper according to the sixth aspect is configured so that a first additional distance is defined between the first center axis and the first interior wall in the arrangement direction. A second additional distance is defined between the second center axis and the second interior wall in the arrangement direction. The first additional distance is longer than the second additional distance.

With the disc brake caliper according to the seventh aspect, since the first additional distance is longer than the second additional distance, it is possible to increase an area in which the first piston can be arranged, increasing an outer diameter of the first piston. Thus, it is possible to increase a braking force and/or to decrease a hydraulic pressure to obtain a braking force compared with the case where the piston is entirely provided closer to the first interior wall than the reference wall plane in the arrangement direction as viewed along the center axis. Accordingly, it is possible to improve braking performance of the disc brake caliper and/or to improve durability of the disc brake caliper.

In accordance with an eighth aspect of the present invention, the disc brake caliper according to any one of the second to fourth, sixth, and seventh aspects is configured so that the second interior wall is provided on an upstream side of the first interior wall in a driving rotational direction of a disc brake rotor.

With the disc brake caliper according to the eighth aspect, it is possible to decrease a braking force on the upstream side of the first interior wall in the driving rotational direction. Thus, it is possible to reduce an uneven wear of the brake pad on the upstream side of the first interior wall.

In accordance with a ninth aspect of the present invention, the disc brake caliper according to any one of the fourth to seventh aspects is configured so that the first piston has a first outer diameter. The second piston has a second outer diameter. The second outer diameter is smaller than the first outer diameter.

With the disc brake caliper according to the ninth aspect, it is possible to change a balance between a first force generated by the first piston and a second force generated by the second piston by changing arrangement of the first piston and the second piston. Thus, it is possible to change a balance of a braking force between an upstream side and a downstream side in the driving rotational direction.

In accordance with a tenth aspect of the present invention, a disc brake caliper of a human-powered vehicle comprises a caliper body, a first piston, and a second piston. The caliper body includes a first hole and a second hole. The first piston is movably provided in the first hole. The first piston has a first outer diameter. The second piston is movably provided in the second hole. The second piston has a second outer diameter. A ratio of the first outer diameter to the second outer diameter is greater than or equal to 1.15.

With the disc brake caliper according to the tenth aspect, since the ratio of the first outer diameter to the second outer diameter is greater than or equal to 1.15, for example, it is possible to change a balance between a first force generated by the first piston and a second force generated by the second piston by changing arrangement of the first piston and the second piston. Thus, it is possible to change a balance of a braking force between an upstream side and a downstream side in the driving rotational direction.

In accordance with an eleventh aspect of the present invention, the disc brake caliper according to the ninth or tenth aspect is configured so that the second outer diameter is larger than or equal to 15 mm.

With the disc brake caliper according to the eleventh aspect, since the second outer diameter is larger than or equal to 15 mm, for example, it is possible to increase the braking force and/or to decrease the hydraulic pressure to obtain the braking force compared with a case where the second outer diameter is smaller than 15 mm. Thus, it is possible to improve the braking performance of the disc brake caliper and/or to improve durability of the disc brake caliper.

In accordance with a twelfth aspect of the present invention, the disc brake caliper according to any one of the ninth to eleventh aspects is configured so that the second outer diameter is smaller than or equal to 17 mm.

With the disc brake caliper according to the twelfth aspect, since the second outer diameter is smaller than or equal to 17 mm, for example, it is possible to restrict the disc brake caliper from enlarging while improving the braking performance of the disc brake caliper and/or improving rigidity of the disc brake caliper.

In accordance with a thirteenth aspect of the present invention, the disc brake caliper according to any one of the fourth to seventh and ninth to twelfth aspects is configured so that the second piston is provided on an upstream side of the first piston in a driving rotational direction of a disc brake rotor.

With the disc brake caliper according to the thirteenth aspect, it is possible to decrease a braking force on the upstream side of the first piston in the driving rotational direction. Thus, it is possible to reduce an uneven wear of the brake pad on the upstream side of the first piston.

In accordance with a fourteenth aspect of the present invention, the disc brake caliper according to any one of the first to thirteenth aspects further comprises a third piston. The caliper body includes the third hole. The third piston is movably provided in the third hole. The third piston has a third outer diameter. The third outer diameter is larger than or equal to 19 mm.

With the disc brake caliper according to the fourteenth aspect, since the third outer diameter is larger than or equal to 19 mm, for example, it is possible to increase a braking force and/or to decrease a hydraulic pressure to obtain a braking force compared with a case where the third outer diameter is smaller than 19 mm. Thus, it is possible to reliably improve the braking performance of the disc brake caliper and/or to improve durability of the disc brake caliper.

In accordance with a fifteenth aspect of the present invention, the disc brake caliper according to the fourteenth aspect is configured so that the first piston has a first center axis and movably provided in the first hole along the first center axis. The first piston at least partially overlaps the third piston as viewed along the first center axis.

With the disc brake caliper according to the fifteenth aspect, the first piston and the third piston can more reliably improve the braking performance of the disc brake caliper and/or to improve durability of the disc brake caliper.

In accordance with a sixteenth aspect of the present invention, the disc brake caliper according to the fourteenth or fifteenth aspect further comprises a fourth piston. The caliper body includes the fourth hole. The fourth piston is movably provided in the fourth hole. The fourth piston has a fourth outer diameter. The fourth outer diameter is smaller than the third outer diameter.

With the disc brake caliper according to the sixteenth aspect, it is possible to increase a braking force and/or to decrease a hydraulic pressure to obtain a braking force compared with a case where the disc brake caliper is free of the fourth piston. Thus, it is possible to improve the braking performance of the disc brake caliper and/or to improve durability of the disc brake caliper.

In accordance with a seventeenth aspect of the present invention, the disc brake caliper according to the sixteenth aspect is configured so that the fourth piston is provided on an upstream side of the third piston in a driving rotational direction of a disc brake rotor.

With the disc brake caliper according to the seventeenth aspect, it is possible to decrease a braking force on the upstream side of the third piston in the driving rotational direction. Thus, it is possible to reduce an uneven wear of the brake pad on the upstream side of the third piston.

In accordance with an eighteenth aspect of the present invention, the disc brake caliper according to the sixteenth or seventeenth aspect is configured so that the fourth outer diameter is larger than or equal to 15 mm.

With the disc brake caliper according to the eighteenth aspect, since the fourth outer diameter is larger than or equal to 15 mm, for example, it is possible to increase the braking force and/or to decrease the hydraulic pressure to obtain the braking force compared with a case where the fourth outer diameter is smaller than 15 mm. Thus, it is possible to improve the braking performance of the disc brake caliper and/or to improve durability of the disc brake caliper.

In accordance with a nineteenth aspect of the present invention, the disc brake caliper according to any one of the sixteenth to eighteenth aspects is configured so that the fourth outer diameter is smaller than or equal to 17 mm.

With the disc brake caliper according to the nineteenth aspect, since the fourth outer diameter is smaller than or equal to 17 mm, for example, it is possible to restrict the disc brake caliper from enlarging while improving the braking performance of the disc brake caliper and/or improving rigidity of the disc brake caliper.

In accordance with a twentieth aspect of the present invention, the disc brake caliper according to any one of the first to nineteenth aspects further comprises a brake pad movable relative to the caliper body.

With the disc brake caliper according to the twentieth aspect, it is possible to apply the braking force to the disc brake rotor using the brake pad.

In accordance with a twenty-first aspect of the present invention, the disc brake caliper according to any one of the first to twentieth aspects is configured so that the caliper body includes a mounting part configured to mount the disc brake caliper to the human-powered vehicle.

With the disc brake caliper according to the twenty-first aspect, the mounting part enables the disc brake caliper to be mounted to the human-powered vehicle.

In accordance with a twenty-second aspect of the present invention, the disc brake caliper according to the twenty-first aspect is configured so that the mounting part includes a first mounting hole and a second mounting hole.

With the disc brake caliper according to the twenty-second aspect, the first mounting hole and the second mounting hole enable the disc brake caliper to be stably mounted to the human-powered vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
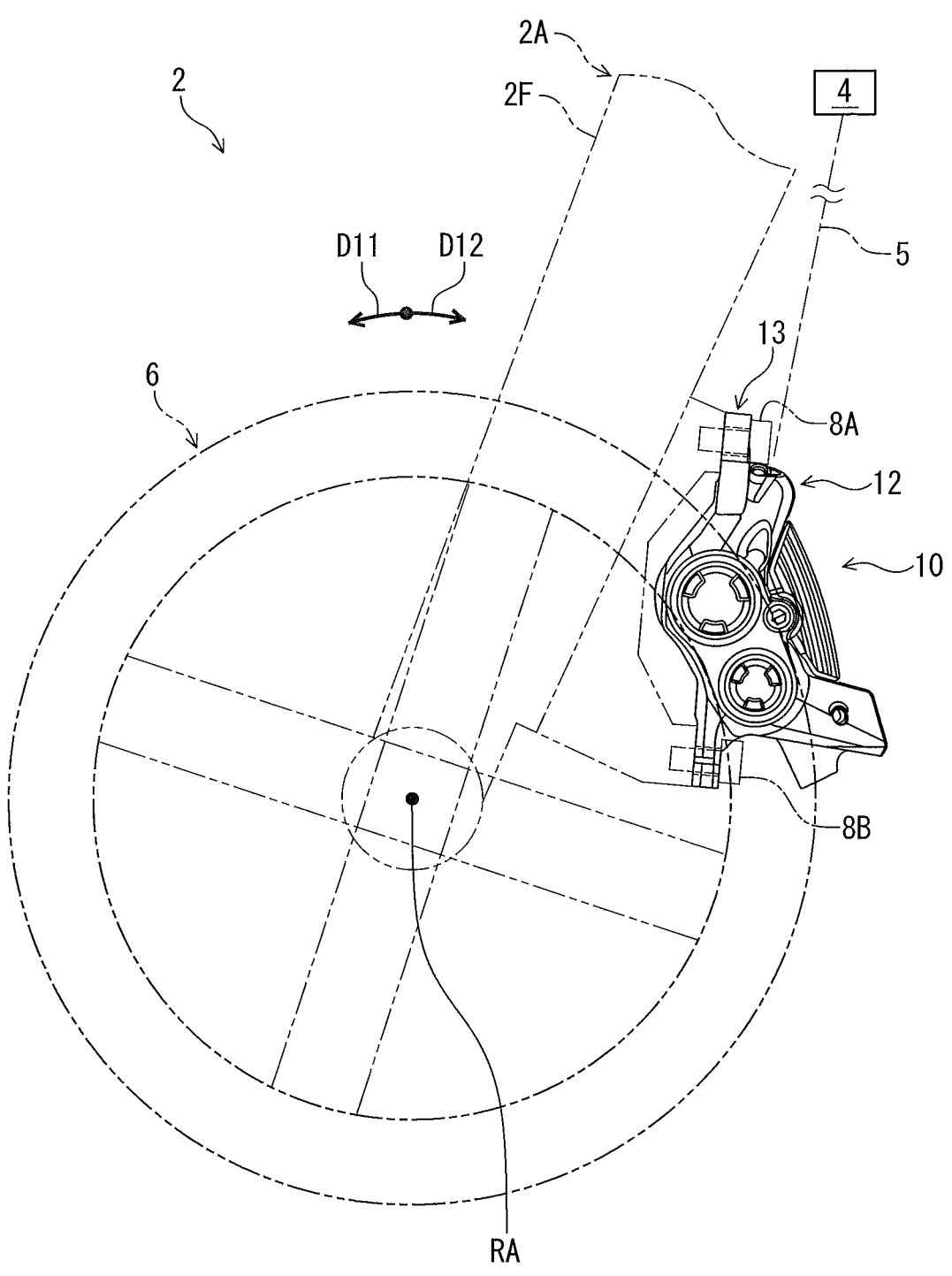
FIG. 1 is a side elevational view of a human-powered vehicle including a disc brake caliper in accordance with an embodiment.

The embodiments will now be described with reference to the accompanying drawings, wherein like reference numerals designate corresponding or identical elements throughout the various drawings.

As seen in FIG. 1, a disc brake caliper 10 for a human-powered vehicle 2 is configured to be connected to an operating device 4 via a hydraulic hose 5. The operating device 4 is configured to supply a hydraulic pressure to the disc brake caliper 10. The disc brake caliper 10 is configured to apply a braking force to a disc brake rotor 6 in response to the hydraulic pressure supplied from the operating device 4. The disc brake rotor 6 is rotatably coupled to a vehicle body 2A about a rotational axis RA. The disc brake rotor 6 rotates relative to the vehicle body 2A in a driving rotational direction D11 while the human-powered vehicle 2 moves forward. The disc brake rotor 6 rotates relative to the vehicle body 2A in an opposite rotational direction D12 while the human-powered vehicle 2 moves backward. The opposite rotational direction D12 is an opposite direction of the driving rotational direction D11.

In the present application, the term "human-powered vehicle" includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

As seen in FIG. 1, the disc brake caliper 10 of the human-powered vehicle 2 comprises a caliper body 12. The caliper body 12 is configured to be mounted to the vehicle body 2A of the human-powered vehicle 2. The caliper body 12 is configured to be coupled to the vehicle body 2A with fasteners 8A and 8B such as screws. The caliper body 12 is configured to be detachably and reattachably coupled to the vehicle body 2A with the fasteners 8A and 8B. For example, the caliper body 12 is configured to be mounted to a front fork 2F of the vehicle body 2A. However, the disc brake caliper 10 can be mounted to other parts (e.g., a chain stay or a seat stay) of the vehicle body 2A if needed and/or desired.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a handle-bar or a steering. Accordingly, these terms, as utilized to describe the disc brake caliper 10 or other components, should be interpreted relative to the human-powered vehicle 2 equipped with the disc brake caliper 10 or other components as used in an upright riding position on a horizontal surface.

The term "detachably and reattachably," as used herein, encompasses a configuration in which an element is repeatedly detachable from and attachable to another element without substantial damage.

Figure 2:
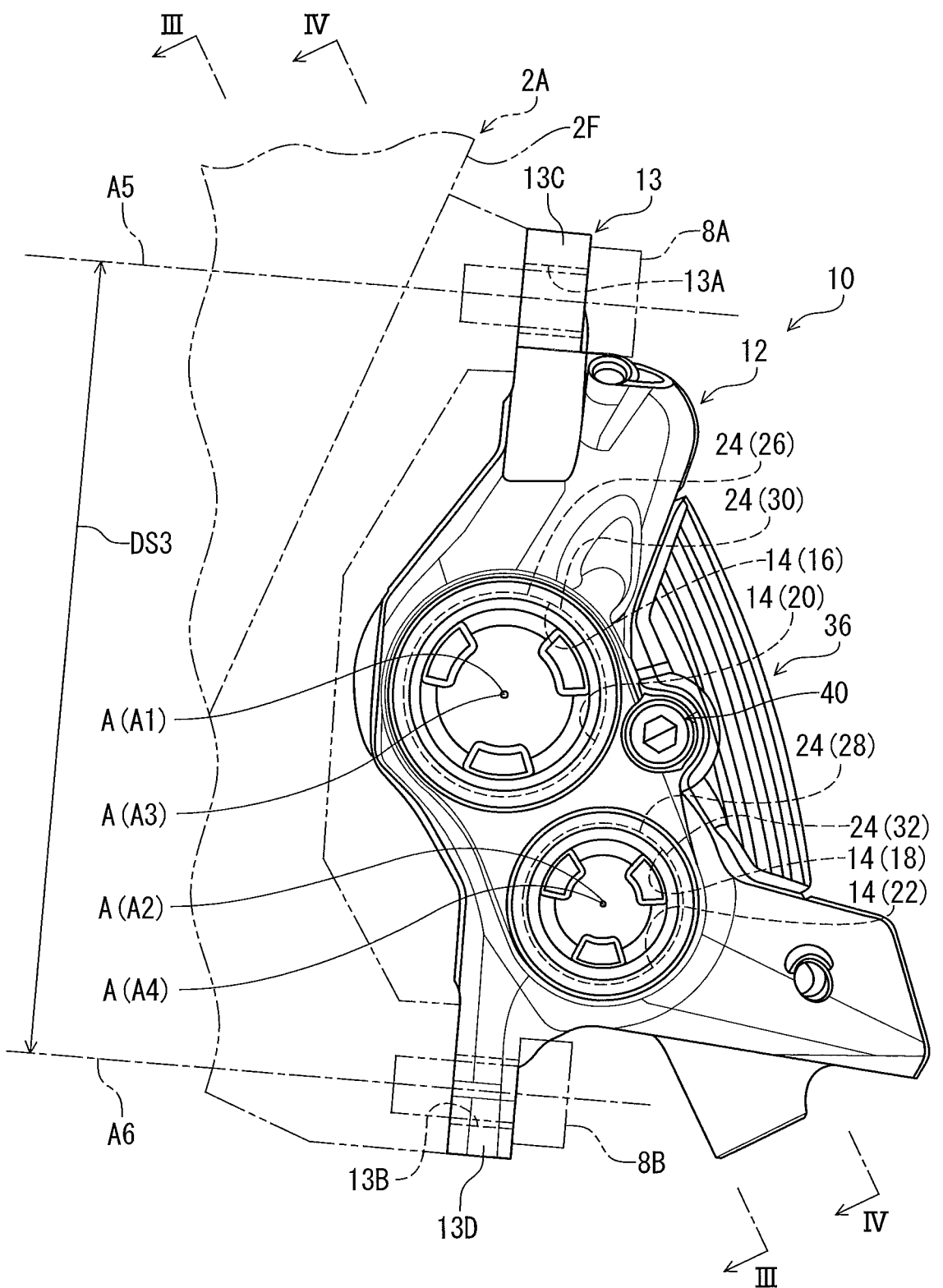
FIG. 2 is a side elevational view of the disc brake caliper illustrated in FIG. 1.

As seen in FIG. 2, the caliper body 12 includes a mounting part 13 configured to mount the disc brake caliper 10 to the human-powered vehicle 2. The mounting part 13 is configured to mount the caliper body 12 to the vehicle body 2A. In the present embodiment, the mounting part 13 includes a first mounting hole 13A and a second mounting hole 13B. The fastener 8A extends through the first mounting hole 13A in a mounting state where the caliper body 12 is mounted to the vehicle body 2A. The fastener 8B extends through the second mounting hole 13B in the mounting state where the caliper body 12 is mounted to the vehicle body 2A. The mounting part 13 includes a first mounting portion 13C and a second mounting portion 13D. The first mounting portion 13C includes the first mounting hole 13A. The second mounting portion 13D includes the second mounting hole 13B. However, the structure of the mounting part 13 is not limited to the illustrated embodiment.

Figure 3:
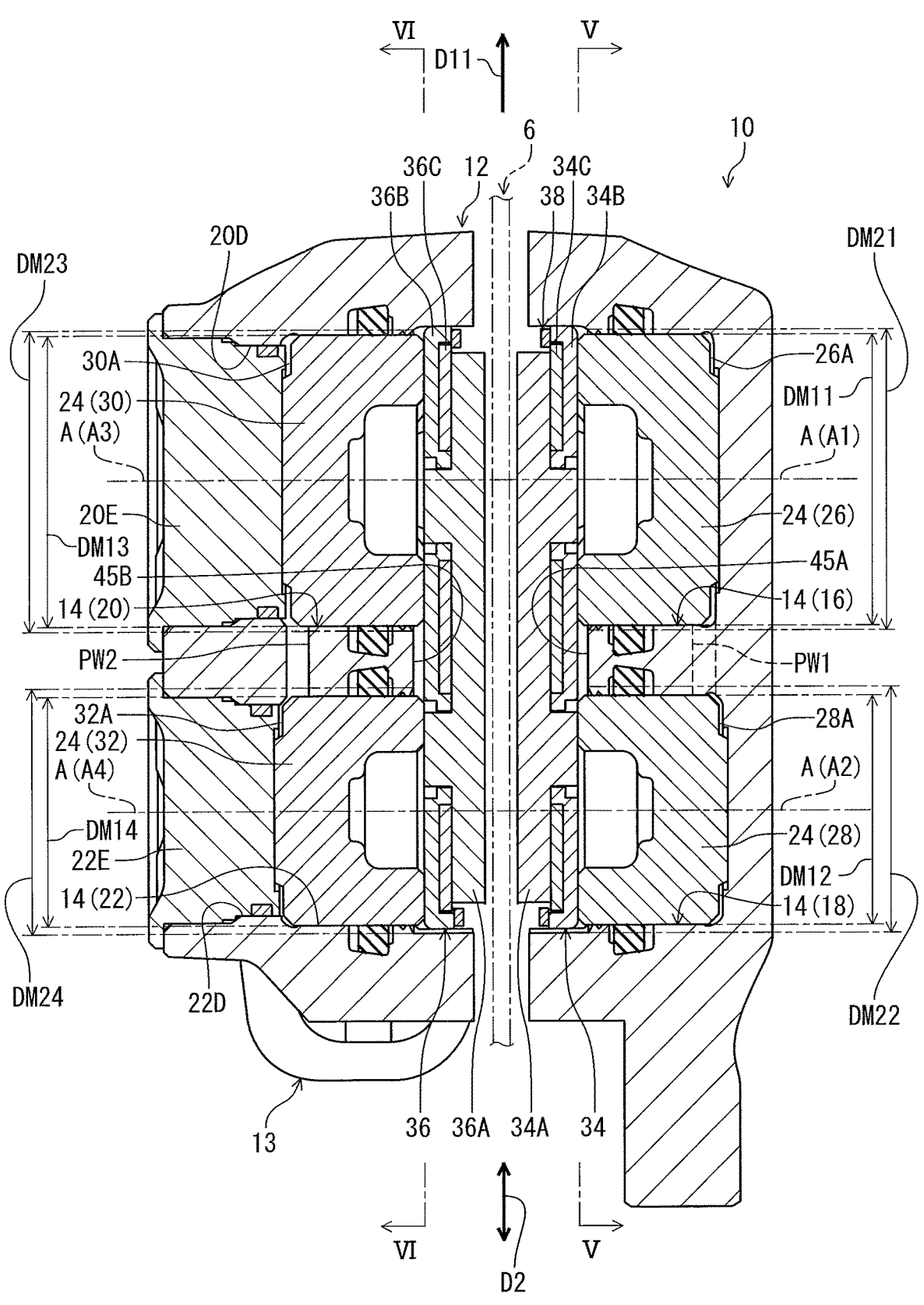
FIG. 3 is a cross-sectional view of the disc brake caliper taken along line III-III of FIG. 2.

As seen in FIG. 3, the caliper body 12 includes a hole 14. In the present embodiment, the hole 14 includes a first hole 16 and a second hole 18. The hole 14 includes a third hole 20 and a fourth hole 22. Namely, the caliper body 12 includes the first hole 16. The caliper body 12 includes the second hole 18. The caliper body 12 includes the third hole 20. The caliper body 12 includes the fourth hole 22. However, at least one of the first hole 16, the second hole 18, the third hole 20, and the fourth hole 22 can be omitted from the caliper body 12 except for another of the first hole 16, the second hole 18, the third hole 20, and the fourth hole 22 if needed and/or desired.

The caliper body 12 includes a first additional hole 20D and a second additional hole 22D. The first additional hole 20D is in communication with the third hole 20. The second additional hole 22D is in communication with the fourth hole 22. The disc brake caliper 10 further comprises a first cap 20E and a second cap 22E. The first cap 20E is secured to the caliper body 12. The second cap 22E is secured to the caliper body 12. The first cap 20E is at least partially provided in the first additional hole 20D to close the first additional hole 20D. The second cap 22E is at least partially provided in the second additional hole 22D to close the second additional hole 22D.

The disc brake caliper 10 of the human-powered vehicle 2 comprises a piston 24. In the present embodiment, the piston 24 includes a first piston 26 and a second piston 28. The piston 24 includes a third piston 30 and a fourth piston 32. Namely, the disc brake caliper 10 of the human-powered vehicle 2 comprises a first piston 26. The disc brake caliper 10 of the human-powered vehicle 2 comprises a second piston 28. The disc brake caliper 10 further comprises a third piston 30. The disc brake caliper 10 further comprises a fourth piston 32. However, at least one of the first piston 26, the second piston 28, the third piston 30, and the fourth piston 32 can be omitted from the caliper body 12 except for another of the first piston 26, the second piston 28, the third piston 30, and the fourth piston 32 if needed and/or desired.

The first piston 26 is movably provided in the first hole 16. The second piston 28 is movably provided in the second hole 18. The third piston 30 is movably provided in the third hole 20. The fourth piston 32 is movably provided in the fourth hole 22.

The piston 24 has a center axis A and is movably provided in the hole 14 along the center axis A. The center axis A includes a first center axis A1 and a second center axis A2. The center axis A includes a third center axis A3 and a fourth center axis A4. The first piston 26 has the first center axis A1. The second piston 28 has the second center axis A2. The third piston 30 has the third center axis A3. The fourth piston 32 has the fourth center axis A4.

The piston 24 is movably provided in the hole 14 along the center axis A. The first piston 26 is movably provided in the first hole 16 along the first center axis A1. The second piston 28 is movably provided in the second hole 18 along the second center axis A2. The third piston 30 is movably provided in the third hole 20 along the third center axis A3. The fourth piston 32 is movably provided in the fourth hole 22 along the fourth center axis A4.

The first center axis A1 extends through the third hole 20. The second center axis A2 extends through the fourth hole 22. The third center axis A3 extends through the first hole 16. The fourth center axis A4 extends through the second hole 18. In the present embodiment, the first center axis A1 coincides with the third center axis A3. The second center axis A2 coincides with the fourth center axis A4. However, the first center axis A1 can be offset from the third center axis A3 if needed and/or desired. The second center axis A2 can be offset from the fourth center axis A4 if needed and/or desired.

The caliper body 12 and the first piston 26 define a first hydraulic chamber 26A in the first hole 16. The caliper body 12 and the second piston 28 define a second hydraulic chamber 28A in the second hole 18. The caliper body 12 and the third piston 30 define a third hydraulic chamber 30A in the third hole 20. The caliper body 12 and the fourth piston 32 define a fourth hydraulic chamber 32A in the fourth hole 22.

The first hydraulic chamber 26A is in communication with the second hydraulic chamber 28A via a passageway PW1. The third hydraulic chamber 30A is in communication with the fourth hydraulic chamber 32A via a passageway PW2. The first hydraulic chamber 26A is in communication with the hydraulic hose 5 via a passageway. The third hydraulic chamber 30A is in communication with the hydraulic hose 5 via a passageway.

As seen in FIG. 3, the first piston 26 has a first outer diameter DM11. The second piston 28 has a second outer diameter DM12. The third piston 30 has a third outer diameter DM13. The fourth piston 32 has a fourth outer diameter DM14. In the present embodiment, the second outer diameter DM12 is smaller than the first outer diameter DM11. The fourth outer diameter DM14 is smaller than the third outer diameter DM13. The first outer diameter DM11 is equal to the third outer diameter DM13. The second outer diameter DM12 is equal to the fourth outer diameter DM14. However, the second outer diameter DM12 can be larger than or equal to the first outer diameter DM11 if needed and/or desired. The fourth outer diameter DM14 can be larger than or equal to the third outer diameter DM13 if needed and/or desired. The first outer diameter DM11 can be different from the third outer diameter DM13 if needed and/or desired. The second outer diameter DM12 can be different from the fourth outer diameter DM14 if needed and/or desired.

In the present embodiment, the first outer diameter DM11 is larger than or equal to 19 mm. The first outer diameter DM11 is smaller than or equal to 40 mm. The second outer diameter DM12 is larger than or equal to 15 mm. The second outer diameter DM12 is smaller than or equal to 17 mm. The third outer diameter DM13 is larger than or equal to 19 mm. The third outer diameter DM13 is smaller than or equal to 40 mm. The fourth outer diameter DM14 is larger than or equal to 15 mm. The fourth outer diameter DM14 is smaller than or equal to 17 mm. However, the first outer diameter DM11 is not limited to the above diameter and range. The second outer diameter DM12 is not limited to the above diameter and range. The third outer diameter DM13 is not limited to the above diameter and range. The fourth outer diameter DM14 is not limited to the above diameter and range.

A ratio of the first outer diameter DM11 to the second outer diameter DM12 is greater than or equal to 1.15. A ratio of the third outer diameter DM13 to the fourth outer diameter DM14 is greater than or equal to 1.15. However, the ratio of the first outer diameter DM11 to the second outer diameter DM12 can be less than 1.15 if needed and/or desired. The ratio of the third outer diameter DM13 to the fourth outer diameter DM14 can be less than 1.15 if needed and/or desired.

The first hole 16 has a first inner diameter DM21. The second hole 18 has a second inner diameter DM22. The third hole 20 has a third inner diameter DM23. The fourth hole 22 has a fourth inner diameter DM24. In the present embodiment, the second inner diameter DM22 is smaller than the first inner diameter DM21. The fourth inner diameter DM24 is smaller than the third inner diameter DM23. The first inner diameter DM21 is equal to the third inner diameter DM23. The second inner diameter DM22 is equal to the fourth inner diameter DM24. However, the second inner diameter DM22 can be larger than or equal to the first inner diameter DM21 if needed and/or desired. The fourth inner diameter DM24 can be larger than or equal to the third inner diameter DM23 if needed and/or desired. The first inner diameter DM21 can be different from the third inner diameter DM23 if needed and/or desired. The second inner diameter DM22 can be different from the fourth inner diameter DM24 if needed and/or desired.

In the present embodiment, the first inner diameter DM21 is larger than or equal to 19.2 mm. The first inner diameter DM21 is smaller than or equal to 40 mm. The second inner diameter DM22 is larger than or equal to 15.2 mm. The second inner diameter DM22 is smaller than or equal to 17 mm. The third inner diameter DM23 is larger than or equal to 19.2 mm. The third inner diameter DM23 is smaller than or equal to 40 mm. The fourth inner diameter DM24 is larger than or equal to 15.2 mm. The fourth inner diameter DM24 is smaller than or equal to 17 mm. However, the first inner diameter DM21 is not limited to the above diameter and range. The second inner diameter DM22 is not limited to the above diameter and range. The third inner diameter DM23 is not limited to the above diameter and range. The fourth inner diameter DM24 is not limited to the above diameter and range.

A ratio of the first outer diameter DM11 to the second outer diameter DM12 is less than or equal to 6. The ratio of the first outer diameter DM11 to the second outer diameter DM12 is less than or equal to 3. The ratio of the first outer diameter DM11 to the second outer diameter DM12 is less than or equal to 2. The ratio of the first outer diameter DM11 to the second outer diameter DM12 is greater than or equal to 1.2. However, the ratio of the first outer diameter DM11 to the second outer diameter DM12 is not limited to the above ranges.

A ratio of the third outer diameter DM13 to the fourth outer diameter DM14 is less than or equal to 6. The ratio of the third outer diameter DM13 to the fourth outer diameter DM14 is less than or equal to 3. The ratio of the third outer diameter DM13 to the fourth outer diameter DM14 is less than or equal to 2. The ratio of the third outer diameter DM13 to the fourth outer diameter DM14 is greater than or equal to 1.2. However, the ratio of the third outer diameter DM13 to the fourth outer diameter DM14 is not limited to the above ranges.

As seen in FIG. 2, the first mounting hole 13A has a first hole center axis A5. The second mounting hole 13B has a second hole center axis A6. A distance DS3 is defined between the first hole center axis A5 and the second hole center axis A6. The distance DS3 ranges from 70 mm to 80 mm. In the present embodiment, the distance DS3 is from 73 mm to 75 mm. A ratio of the first outer diameter DM11 to the distance DS3 is greater than 0.25. The ratio of the first outer diameter DM11 to the distance DS3 is less than 0.57. However, the distance DS3 is not limited to the above distance and range. The ratio of the first outer diameter DM11 to the distance DS3 is not limited to the above range.

The first piston 26 at least partially overlaps the third piston 30 as viewed along the first center axis A1. The second piston 28 at least partially overlaps the fourth piston 32 as viewed along the second center axis A2. In the present embodiment, the first piston 26 entirely overlaps the third piston 30 as viewed along the first center axis A1. The second piston 28 entirely overlaps the fourth piston 32 as viewed along the second center axis A2. However, the first piston 26 can be arranged to partially overlap or entirely offset from the third piston 30 as viewed along the first center axis A1 if needed and/or desired. The second piston 28 can be arranged to partially overlap or entirely offset from the fourth piston 32 as viewed along the second center axis A2 if needed and/or desired.

As seen in FIG. 3, the disc brake caliper 10 further comprises a brake pad 34. The disc brake caliper 10 further comprises a brake pad 36. The brake pad 34 is movable relative to the caliper body 12. The brake pad 36 is movable relative to the caliper body 12. The brake pad 34 can also be referred to as a first brake pad 34. The brake pad 36 can also be referred to as a second brake pad 36.

The brake pad 34 includes a pad 34A, a back plate 34B, and a base plate 34C. The base plate 34C is at least partially provided between the pad 34A and the back plate 34B. The pad 34A is contactable with the disc brake rotor 6. The back plate 34B is contactable with the first piston 26 and the second piston 28. The pad 34A is attached to the base plate 34C. The back plate 34B is attached to the base plate 34C. However, the structure of the brake pad 34 is not limited to the illustrated embodiment.

The brake pad 36 includes a pad 36A, a back plate 36B, and a base plate 36C. The base plate 36C is at least partially provided between the pad 36A and the back plate 36B. The pad 36A is contactable with the disc brake rotor 6. The back plate 36B is contactable with the third piston 30 and the fourth piston 32. The pad 36A is attached to the base plate 36C. The back plate 36B is attached to the base plate 36C. However, the structure of the brake pad 36 is not limited to the illustrated embodiment.

Figure 4:
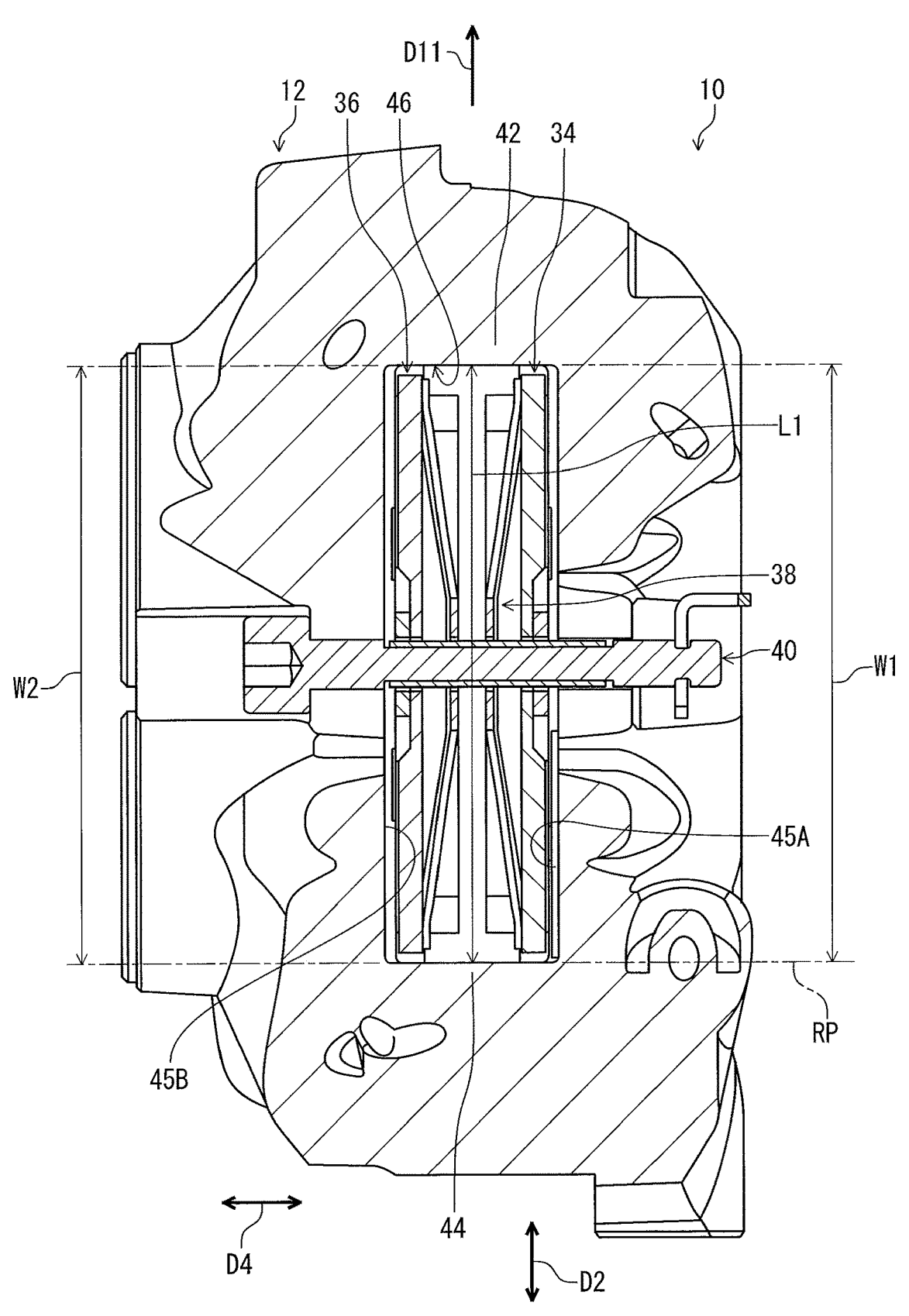
FIG. 4 is a cross-sectional view of the disc brake caliper taken along line IV-IV of FIG. 2.

As seen in FIG. 4, the disc brake caliper 10 includes a biasing member 38. The biasing member 38 is configured to bias the brake pad 34 away from the brake pad 36. The biasing member 38 is configured to bias the brake pad 36 away from the brake pad 34. The biasing member 38 is provided between the brake pad 34 and the brake pad 36.

The disc brake caliper 10 includes a pad axle 40. The pad axle 40 is coupled to the caliper body 12 to support movably the brake pad 34 and the brake pad 36. The pad axle 40 is coupled to the caliper body 12 to support movably the biasing member 38.

In the present embodiment, the caliper body 12 is integrally provided as a one-piece unitary member. However, the caliper body 12 can be at least two separate members if needed and/or desired.

As seen in FIG. 4, the caliper body 12 includes a first interior wall 42 and a second interior wall 44. The first interior wall 42 and the second interior wall 44 are spaced apart in an arrangement direction D2. The caliper body 12 includes a pad space 46 in which the brake pad 34 and/or 36 is to be at least partially provided. The pad space 46 is defined between the first interior wall 42 and the second interior wall 44 in the arrangement direction D2. The brake pad 34 is movably provided in the pad space 46. The brake pad 36 is movably provided in the pad space 46.

The caliper body 12 includes a first inner surface 45A and a second inner surface 45B. The second inner surface 45B is spaced apart from the first inner surface 45A in an additional arrangement direction D4. The first inner surface 45A extends between the first interior wall 42 and the second interior wall 44 in the arrangement direction D2. The second inner surface 45B extends between the first interior wall 42 and the second interior wall 44 in the arrangement direction D2. In the present embodiment, the additional arrangement direction D4 is perpendicular to the arrangement direction D2. However, the additional arrangement direction D4 can be non-perpendicular to the arrangement direction D2 if needed and/or desired.

Figure 5:
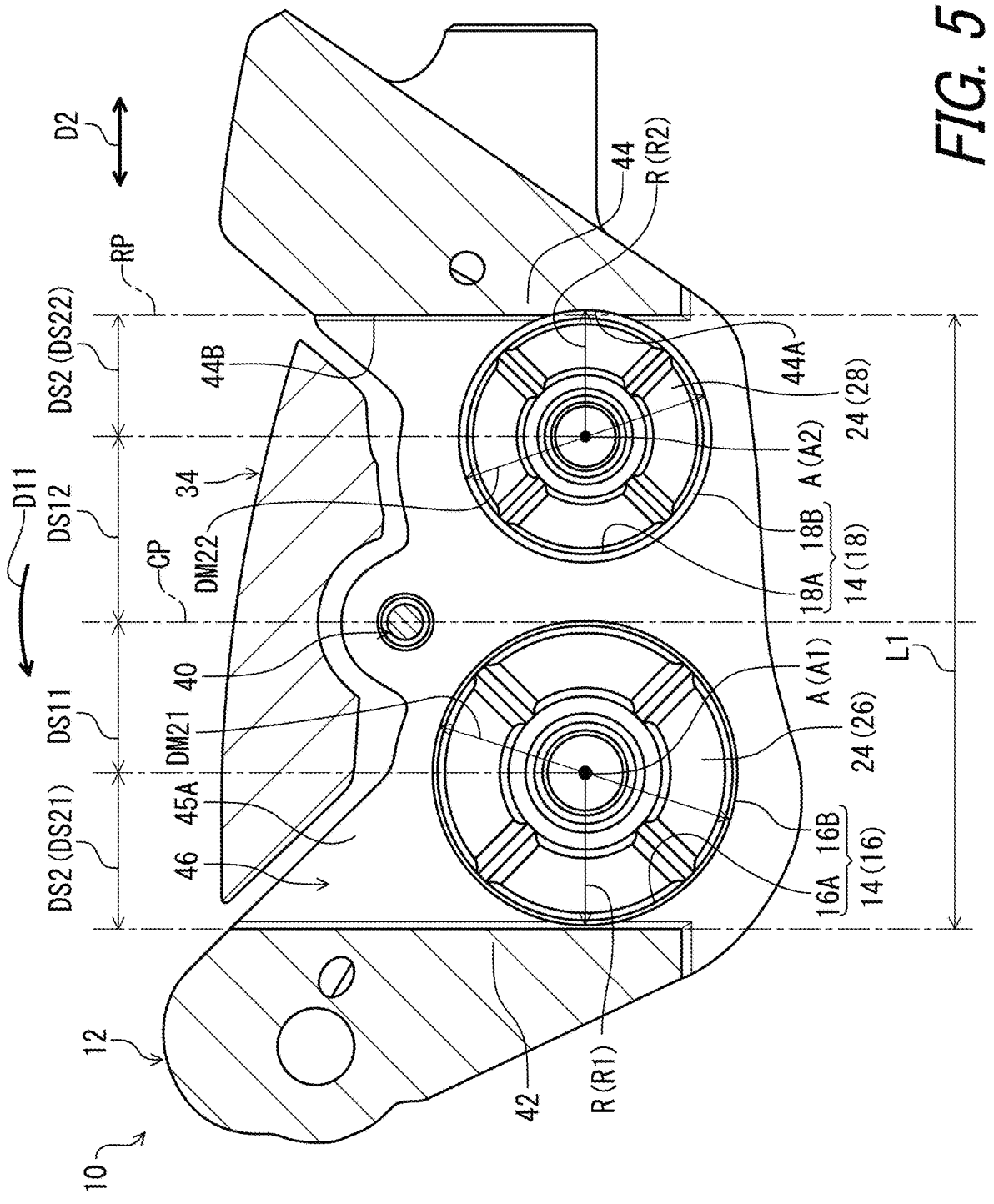
FIG. 5 is a cross-sectional view of the disc brake caliper taken along line V-V of FIG. 3.

As seen in FIG. 5, in the present embodiment, the second hole 18 is provided on an upstream side of the first hole 16 in the driving rotational direction D11 of the disc brake rotor 6. The second piston 28 is provided on an upstream side of the first piston 26 in the driving rotational direction D11 of the disc brake rotor 6. The second interior wall 44 is provided on an upstream side of the first interior wall 42 in the driving rotational direction D11 of the disc brake rotor 6. However, the second hole 18 can be provided on a downstream side of the first hole 16 in the driving rotational direction D11 of the disc brake rotor 6 if needed and/or desired. The second piston 28 can be provided on a downstream side of the first piston 26 in the driving rotational direction D11 of the disc brake rotor 6 if needed and/or desired. The second interior wall 44 can be provided on a downstream side of the first interior wall 42 in the driving rotational direction D11 of the disc brake rotor 6 if needed and/or desired.

The second interior wall 44 has a proximal surface 44A and a distal surface 44B. The proximal surface 44A is at least partially provided farther from the first interior wall 42 than the distal surface 44B in the arrangement direction D2. In the present embodiment, the proximal surface 44A has a curved shape. The distal surface 44B has a flat shape. However, the proximal surface 44A can have another shape other than the curved shape instead of or in addition to the curved shape if needed and/or desired. The distal surface 44B can have another shape other than the flat shape instead of or in addition to the flat shape if needed and/or desired.

In the present embodiment, the proximal surface 44A is partially provided farther from the first interior wall 42 than the distal surface 44B in the arrangement direction D2. However, the proximal surface 44A can be entirely provided farther from the first interior wall 42 than the distal surface 44B in the arrangement direction D2 if needed and/or desired.

The caliper body 12 includes a reference wall plane RP defined on the distal surface 44B. The reference wall plane RP is defined to linearly extend along the distal surface 44B as viewed along the center axis A. The reference wall plane RP is perpendicular to the arrangement direction D2.

The hole 14 is partially provided farther from the first interior wall 42 than the reference wall plane RP in the arrangement direction D2 as viewed along the center axis A. In the present embodiment, the second hole 18 is partially provided farther from the first interior wall 42 than the reference wall plane RP in the arrangement direction D2 as viewed along the second center axis A2. The first hole 16 is entirely provided closer to the second interior wall 44 than the first interior wall 42 in the arrangement direction D2 as viewed along the center axis A. However, the second hole 18 can be entirely provided closer to the first interior wall 42 than the reference wall plane RP in the arrangement direction D2 as viewed along the second center axis A2 if needed and/or desired. The first hole 16 can be partially provided farther from the second interior wall 44 than the first interior wall 42 in the arrangement direction D2 as viewed along the center axis A if needed and/or desired.

The pad space 46 has a length L1 defined between the first interior wall 42 and the second interior wall 44 in the arrangement direction D2. A first distance DS11 is defined between the first center axis A1 and a reference center plane CP in the arrangement direction D2. The reference center plane CP is perpendicular to the arrangement direction D2 and is defined to bisect the length L1 of the pad space 46 in the arrangement direction D2. A second distance DS12 is defined between the second center axis A2 and the reference center plane CP in the arrangement direction D2. The first distance DS11 is defined as a minimum distance between the first center axis A1 and the reference center plane CP in the arrangement direction D2. The second distance DS12 is defined as a minimum distance between the second center axis A2 and the reference center plane CP in the arrangement direction D2. In the present embodiment, the first distance DS11 is shorter than the second distance DS12. However, the first distance DS11 can be longer than or equal to the second distance DS12 if needed and/or desired.

The hole 14 has an inner radius R. The inner radius R is larger than a distance DS2 defined between the reference wall plane RP and the center axis A in the arrangement direction D2. The inner radius R includes a first inner radius R1 and a second inner radius R2. The distance DS2 includes a first additional distance DS21 and a second additional distance DS22. The first hole 16 has the first inner radius R1. The first inner radius R1 is a half of the first inner diameter DM21 (see e.g., FIG. 3). The second hole 18 has the second inner radius R2. The second inner radius R2 is a half of the second inner diameter DM22 (see e.g., FIG. 3). The first additional distance DS21 is defined between the first center axis A1 and the first interior wall 42 in the arrangement direction D2. The second additional distance DS22 is defined between the second center axis A2 and the second interior wall 44 in the arrangement direction D2.

In the present embodiment, the first additional distance DS21 is longer than the second additional distance DS22. The second inner radius R2 is larger than the second additional distance DS22 defined between the reference wall plane RP and the second center axis A2 in the arrangement direction D2. The first inner radius R1 is smaller than the first additional distance DS21 defined between the reference wall plane RP and the first center axis A1 in the arrangement direction D2. However, the first additional distance DS21 can be shorter than or equal to the second additional distance DS22 if needed and/or desired. The second inner radius R2 can be smaller than the second additional distance DS22 if needed and/or desired. The first inner radius R1 can be larger than the first additional distance DS21 if needed and/or desired.

The length L1 of the pad space 46 ranges from 35 mm to 45 mm. In the present embodiment, the length L1 ranges from 39 mm to 40 mm. A ratio of the first outer diameter DM11 to the length L1 is greater than 0.47. The ratio of the first outer diameter DM11 to the length L1 is less than 1. However, the length L1 is not limited to the above length and range. The ratio of the first outer diameter DM11 to the length L1 is not limited to the above range.

As seen in FIG. 4, the brake pad 34 has a pad width W1 defined in the arrangement direction D2. The pad width W1 ranges from 35 mm to 45 mm. In the present embodiment, the pad width W1 ranges from 39 mm to 40 mm. The pad width W1 is shorter than the length L1 of the pad space 46. A ratio of the first outer diameter DM11 to the pad width W1 is greater than 0.48. The ratio of the first outer diameter DM11 to the pad width W1 is less than 1. However, the pad width W1 is not limited to the above width and range. The ratio of the first outer diameter DM11 to the pad width W1 is not limited to the above range.

The brake pad 36 has a pad width W2 defined in the arrangement direction D2. The pad width W2 ranges from 35 mm to 45 mm. In the present embodiment, the pad width W2 ranges from 39 mm to 40 mm. The pad width W2 is shorter than the length L1 of the pad space 46. A ratio of the first outer diameter DM11 to the pad width W2 is greater than 0.48. The ratio of the first outer diameter DM11 to the pad width W2 is less than 1. However, the pad width W2 is not limited to the above width and range. The ratio of the first outer diameter DM11 to the pad width W2 is not limited to the above range.

Figure 6:
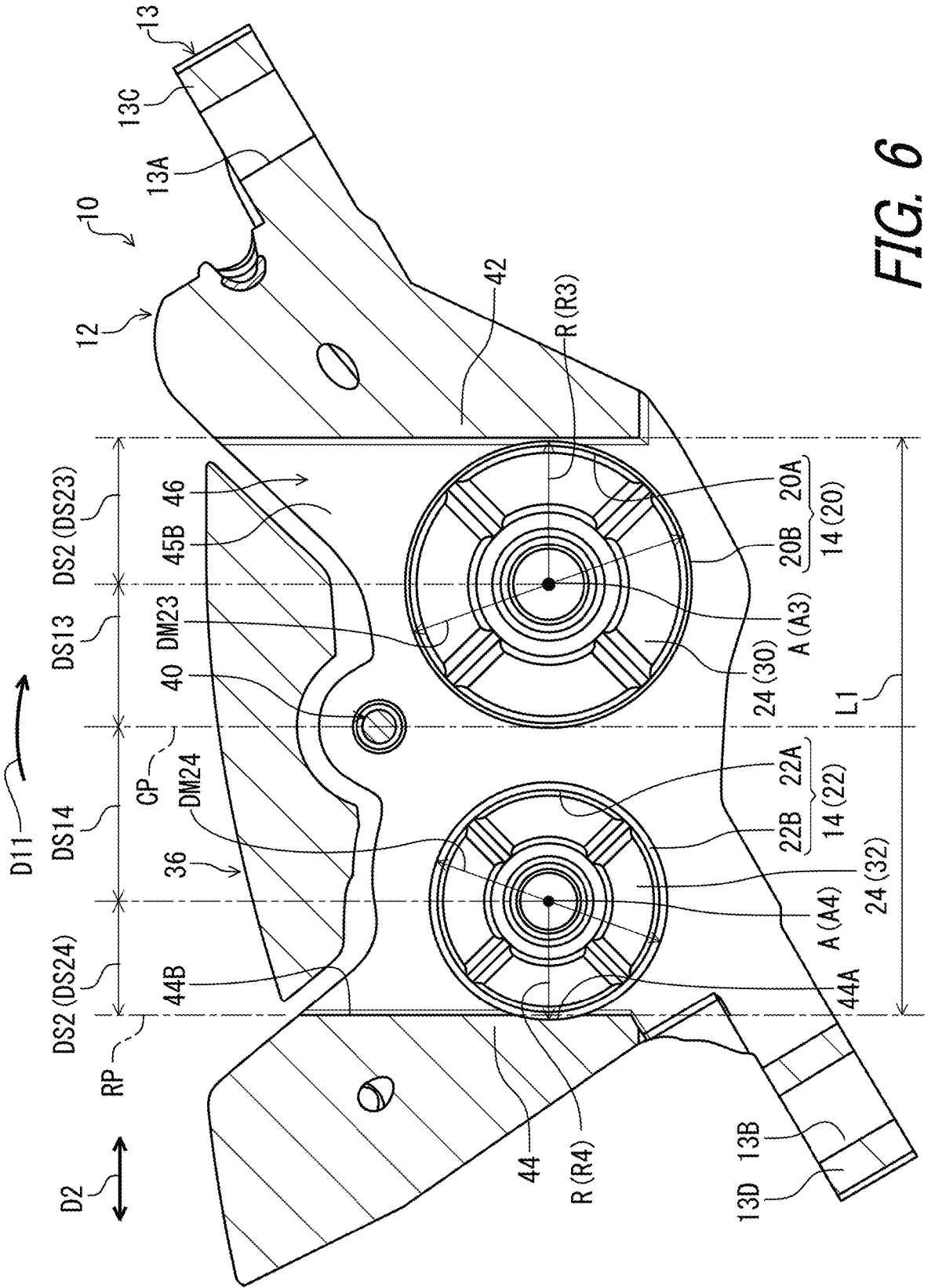
FIG. 6 is a cross-sectional view of the disc brake caliper taken along line VI-VI of FIG. 3.

As seen in FIG. 6, in the present embodiment, the fourth hole 22 is provided on an upstream side of the third hole 20 in the driving rotational direction D11 of the disc brake rotor 6. The fourth piston 32 is provided on an upstream side of the third piston 30 in the driving rotational direction D11 of the disc brake rotor 6. The second interior wall 44 is provided on an upstream side of the first interior wall 42 in the driving rotational direction D11 of the disc brake rotor 6. However, the fourth hole 22 can be provided on a downstream side of the third hole 20 in the driving rotational direction D11 of the disc brake rotor 6 if needed and/or desired. The fourth piston 32 can be provided on a downstream side of the third piston 30 in the driving rotational direction D11 of the disc brake rotor 6 if needed and/or desired.

The fourth piston 32 is partially provided farther from the first interior wall 42 than the reference wall plane RP in the arrangement direction D2 as viewed along the second center axis A2. The third piston 30 is entirely provided closer to the second interior wall 44 than the first interior wall 42 in the arrangement direction D2 as viewed along the center axis A. However, the fourth piston 32 can be entirely provided closer to the first interior wall 42 than the reference wall plane RP in the arrangement direction D2 as viewed along the second center axis A2 if needed and/or desired. The third piston 30 can be partially provided farther from the second interior wall 44 than the first interior wall 42 in the arrangement direction D2 as viewed along the center axis A if needed and/or desired.

A third distance DS13 is defined between the third center axis A3 and the reference center plane CP in the arrangement direction D2. A fourth distance DS14 is defined between the fourth center axis A4 and the reference center plane CP in the arrangement direction D2. The third distance DS13 is defined as a minimum distance between the third center axis A3 and the reference center plane CP in the arrangement direction D2. The fourth distance DS14 is defined as a minimum distance between the fourth center axis A4 and the reference center plane CP in the arrangement direction D2. In the present embodiment, the third distance DS13 is shorter than the fourth distance DS14. However, the third distance DS13 can be longer than or equal to the fourth distance DS14 if needed and/or desired.

The inner radius R includes a third inner radius R3 and a fourth inner radius R4. The distance DS2 includes a third additional distance DS23 and a fourth additional distance DS24. The third hole 20 has the third inner radius R3. The third inner radius R3 is a half of the third inner diameter DM23 (see e.g., FIG. 3). The fourth hole 22 has the fourth inner radius R4. The fourth inner radius R4 is a half of the fourth inner diameter DM24 (see e.g., FIG. 3). The third additional distance DS23 is defined between the third center axis A3 and the first interior wall 42 in the arrangement direction D2. The fourth additional distance DS24 is defined between the fourth center axis A4 and the second interior wall 44 in the arrangement direction D2.

In the present embodiment, the third additional distance DS23 is longer than the fourth additional distance DS24. The fourth inner radius R4 is larger than the fourth additional distance DS24 defined between the reference wall plane RP and the fourth center axis A4 in the arrangement direction D2. The third inner radius R3 is smaller than the third additional distance DS23 defined between the reference wall plane RP and the third center axis A3 in the arrangement direction D2. However, the third additional distance DS23 can be shorter than or equal to the fourth additional distance DS24 if needed and/or desired. The fourth inner radius R4 can be smaller than the fourth additional distance DS24 if needed and/or desired. The third inner radius R3 can be larger than the third additional distance DS23 if needed and/or desired.

Figure 7:
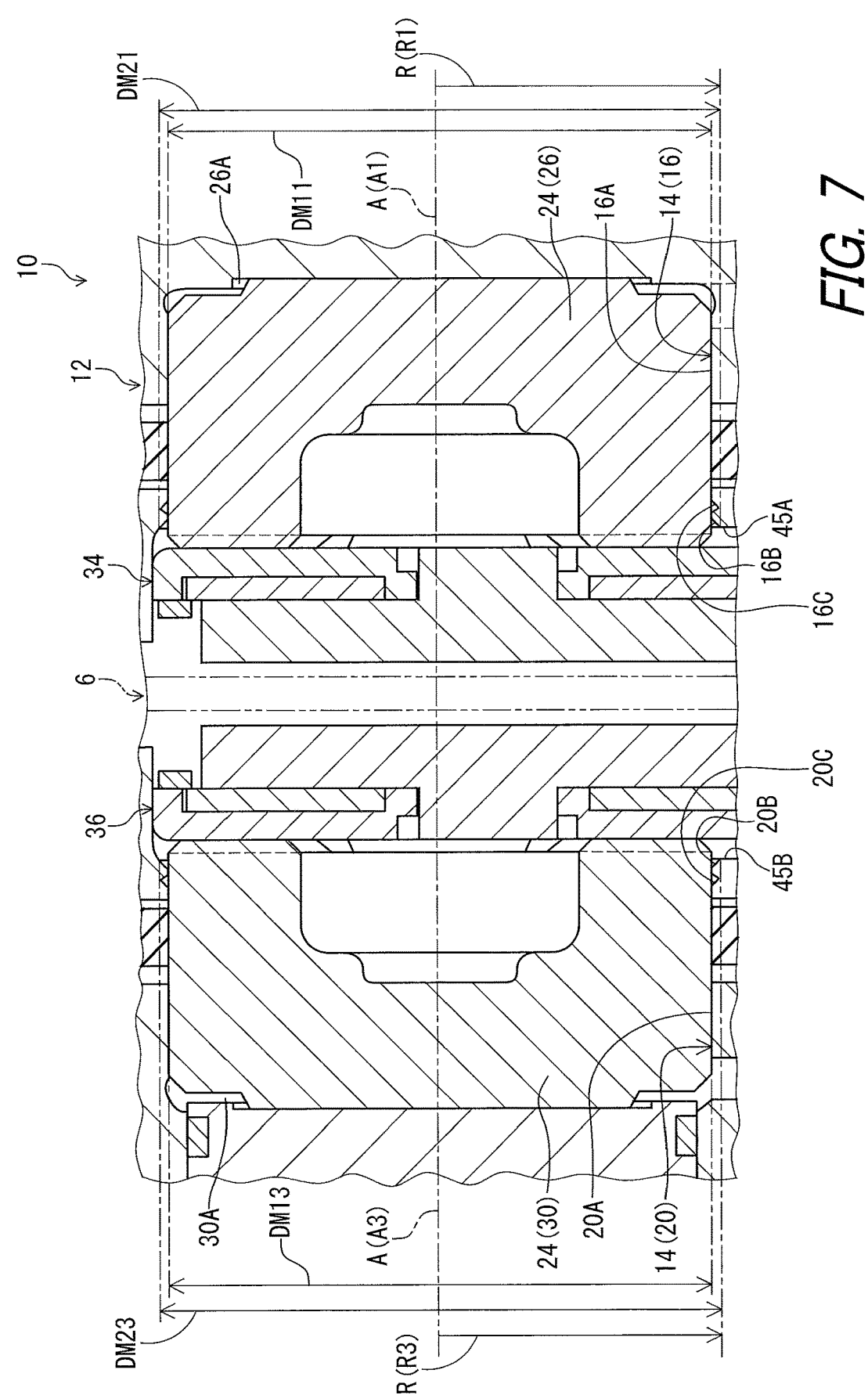
FIG. 7 is a partial enlarged cross-sectional view of the disc brake caliper illustrated in FIG. 3.

As seen in FIG. 7, the caliper body 12 includes a first inner peripheral surface 16A, a first chamfer 16B, and a first groove 16C. The first chamfer 16B is inclined relative to the first center axis A1. The first chamfer 16B is non-perpendicular to and non-parallel to the first center axis A1. The first chamfer 16B extends from the first inner peripheral surface 16A to the first inner surface 45A to increase a distance defined radially outwardly from the first center axis A1 to the first chamfer 16B. The first inner peripheral surface 16A and the first chamfer 16B define the first hole 16. The first groove 16C is provided on the first inner peripheral surface 16A.

As seen in FIG. 5, the first chamfer 16B has an annular shape. The first chamfer 16B is provided radially outwardly of the first piston 26 as viewed along the first center axis A1. The first chamfer 16B surrounds the first piston 26 as viewed along the first center axis A1. As seen in FIGS. 5 and 7, the first inner diameter DM21 is defined as a maximum inner diameter of the first chamfer 16B. The first inner radius R1 is defined as a maximum inner radius of the first chamfer 16B. However, the first chamfer 16B can be omitted from the first hole 16 if needed and/or desired. The first groove 16C can be omitted from the first hole 16 if needed and/or desired.

Figure 8:
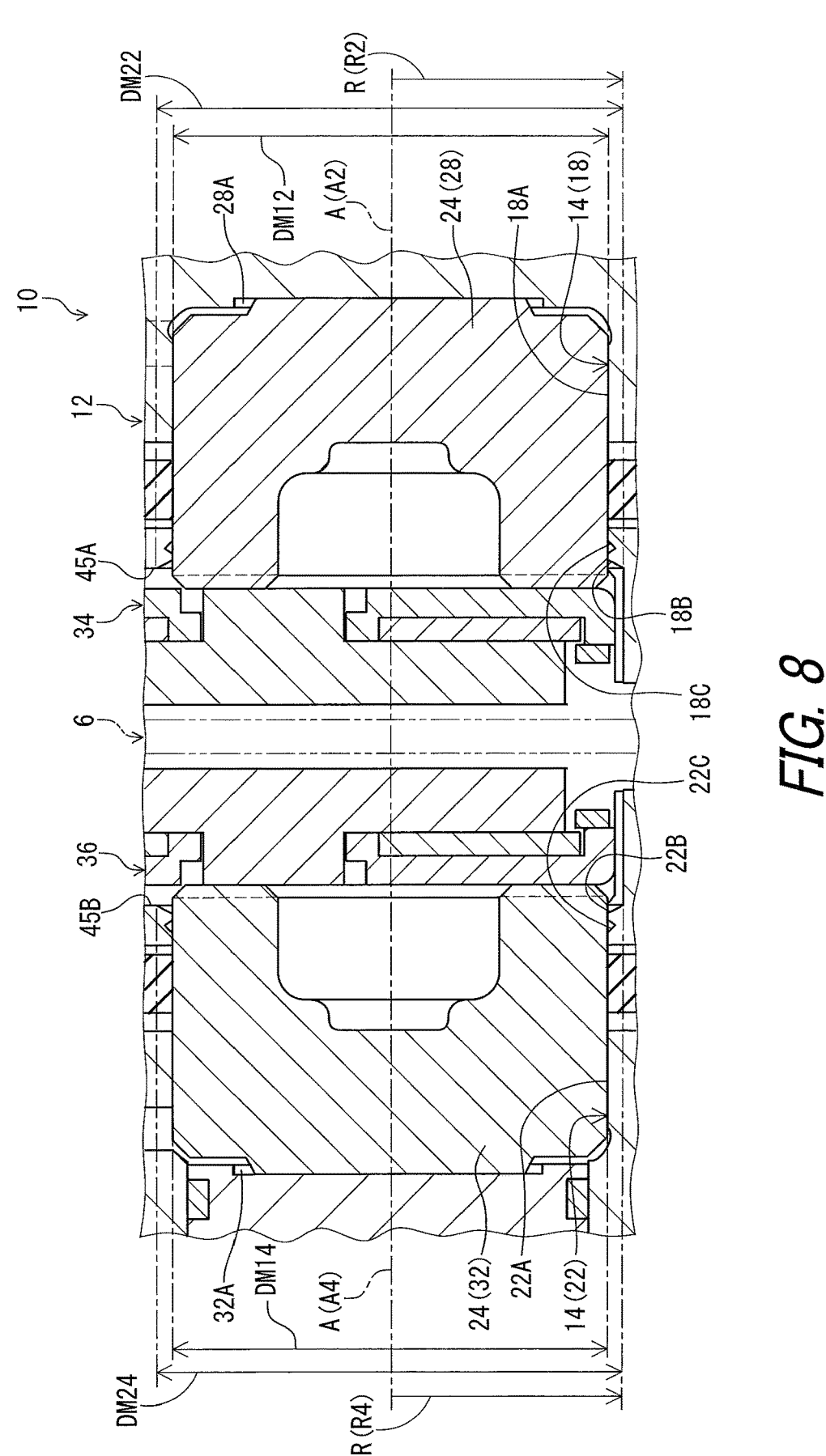
FIG. 8 is a partial enlarged cross-sectional view of the disc brake caliper illustrated in FIG. 3.

As seen in FIG. 8, the caliper body 12 includes a second inner peripheral surface 18A, a second chamfer 18B, and a second groove 18C. The second chamfer 18B is inclined relative to the second center axis A2. The second chamfer 18B is non-perpendicular to and non-parallel to the second center axis A2. The second chamfer 18B extends from the second inner peripheral surface 18A to the first inner surface 45A to increase a distance defined radially outwardly from the second center axis A2 to the second chamfer 18B. The second inner peripheral surface 18A and the second chamfer 18B define the second hole 18. The second groove 18C is provided on the second inner peripheral surface 18A.

As seen in FIG. 5, the second chamfer 18B has an annular shape. The second chamfer 18B is provided radially outwardly of the second piston 28 as viewed along the second center axis A2. The second chamfer 18B surrounds the second piston 28 as viewed along the second center axis A2. As seen in FIGS. 5 and 8, the second inner diameter DM22 is defined as a maximum inner diameter of the second chamfer 18B. The second inner radius R2 is defined as a maximum inner radius of the second chamfer 18B. However, the second chamfer 18B can be omitted from the second hole 18 if needed and/or desired. The second groove 18C can be omitted from the second hole 18 if needed and/or desired.

As seen in FIG. 7, the caliper body 12 includes a third inner peripheral surface 20A, a third chamfer 20B, and a third groove 20C. The third chamfer 20B is inclined relative to the third center axis A3. The third chamfer 20B is non-perpendicular to and non-parallel to the third center axis A3. The third chamfer 20B extends from the third inner peripheral surface 20A to the second inner surface 45B to increase a distance defined radially outwardly from the third center axis A3 to the third chamfer 20B. The third inner peripheral surface 20A and the third chamfer 20B define the third hole 20. The third groove 20C is provided on the third inner peripheral surface 20A.

As seen in FIG. 6, the third chamfer 20B has an annular shape. The third chamfer 20B is provided radially outwardly of the third piston 30 as viewed along the third center axis A3. The third chamfer 20B surrounds the third piston 30 as viewed along the third center axis A3. As seen in FIGS. 6 and 7, the third inner diameter DM23 is defined as a maximum inner diameter of the third chamfer 20B. The third inner radius R3 is defined as a maximum inner radius of the third chamfer 20B. However, the third chamfer 20B can be omitted from the third hole 20 if needed and/or desired. The third groove 20C can be omitted from the third hole 20 if needed and/or desired.

As seen in FIG. 8, the caliper body 12 includes a fourth inner peripheral surface 22A, a fourth chamfer 22B, and a fourth groove 22C. The fourth chamfer 22B is inclined relative to the fourth center axis A4. The fourth chamfer 22B is non-perpendicular to and non-parallel to the fourth center axis A4. The fourth chamfer 22B extends from the fourth inner peripheral surface 22A to the second inner surface 45B to increase a distance defined radially outwardly from the fourth center axis A4 to the fourth chamfer 22B. The fourth inner peripheral surface 22A and the fourth chamfer 22B define the fourth hole 22. The fourth groove 22C is provided on the fourth inner peripheral surface 22A.

As seen in FIG. 6, the fourth chamfer 22B has an annular shape. The fourth chamfer 22B is provided radially outwardly of the fourth piston 32 as viewed along the fourth center axis A4. The fourth chamfer 22B surrounds the fourth piston 32 as viewed along the fourth center axis A4. As seen in FIGS. 6 and 8, the fourth inner diameter DM24 is defined as a maximum inner diameter of the fourth chamfer 22B. The fourth inner radius R4 is defined as a maximum inner radius of the fourth chamfer 22B. However, the fourth chamfer 22B can be omitted from the fourth hole 22 if needed and/or desired. The fourth groove 22C can be omitted from the fourth hole 22 if needed and/or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A disc brake caliper of a human-powered vehicle, comprising:
   a caliper body including:
      a first hole having a first inner diameter;
      a second hole having a second inner diameter;
      a first interior wall;
      a second interior wall; and
      a pad space in which a brake pad is to be at least partially provided, the pad space being defined between the first interior wall and the second interior wall in an arrangement direction;
   a first piston movably provided in the first hole, the first piston having a first outer diameter, the first outer diameter being larger than or equal to 19 mm;
   a second piston movably provided in the second hole;
   the first hole being spaced apart from the second hole to define a distance between the first hole and the second hole in the arrangement direction;
   the pad space having a length defined between the first interior wall and the second interior wall in the arrangement direction; and
   a total of the first inner diameter, the second inner diameter, and the distance being greater than the length of the pad space.

2. The disc brake caliper according to claim 1, further comprising
   a third piston, wherein
   the caliper body includes the third hole,
   the third piston is movably provided in the third hole,
   the third piston has a third outer diameter, and
   the third outer diameter is larger than or equal to 19 mm.

3. The disc brake caliper according to claim 2, wherein
   the first piston has a first center axis and movably provided in the first hole along the first center axis,
   the first piston at least partially overlaps the third piston as viewed along the first center axis.

4. The disc brake caliper according to claim 2, further comprising
   a fourth piston, wherein the caliper body includes the fourth hole,
the fourth piston is movably provided in the fourth hole,
the fourth piston has a fourth outer diameter, and
the fourth outer diameter is smaller than the third outer diameter.

5. The disc brake caliper according to claim 4, wherein
   the fourth piston is provided on an upstream side of the third piston in a driving rotational direction of a disc brake rotor.

6. The disc brake caliper according to claim 4, wherein
   the fourth outer diameter is larger than or equal to 15 mm.

7. The disc brake caliper according to claim 4, wherein
   the fourth outer diameter is smaller than or equal to 17 mm.

8. The disc brake caliper according to claim 1, further comprising
   the brake pad movable relative to the caliper body.

9. The disc brake caliper according to claim 1, wherein
   the caliper body includes a mounting part configured to mount the disc brake caliper to the human-powered vehicle.

10. The disc brake caliper according to claim 9, wherein
    the mounting part includes a first mounting hole and a second mounting hole.

11. The disc brake caliper according to claim 1, wherein
    the first piston has a first center axis and is movably provided in the first hole along the first center axis,
    the caliper body includes a first inner peripheral surface and a first chamfer,
    the first chamfer is inclined relative to the first center axis and the first chamfer extends from the first inner peripheral surface to increase a distance defined radially outward from the first center axis to the first chamfer,
    the first inner peripheral surface and the first chamfer define the first hole, and
    the first inner diameter is defined as a maximum inner diameter of the first chamfer.

12. The disc brake caliper according to claim 11, wherein
    the second piston has a second center axis and is movably provided in the second hole along the second center axis,
    the caliper body includes a second inner peripheral surface and a second chamfer,
    the second chamfer is inclined relative to the second center axis and the second chamfer extends from the second inner peripheral surface to increase a distance defined radially outward from the second center axis to the second chamfer,
    the second inner peripheral surface and the second chamfer define the second hole, and
    the second inner diameter is defined as a maximum inner diameter of the second chamfer.

* * * * *